United States Patent
Song (10) Patent No.: US 10,287,041 B2
(45) Date of Patent: May 14, 2019

(54) ELECTRIC VACUUM-PUMPING AND TINFOIL-CUTTING INTEGRATED MACHINE

(71) Applicant: Zhuhai Kelitong Electronic Co., Ltd., Zhuhai (CN)

(72) Inventor: Xiaoxian Song, Guangdong (CN)

( * ) Notice: Subject to any disclaimer, the term of this patent is extended or adjusted under 35 U.S.C. 154(b) by 105 days.

(21) Appl. No.: 15/646,100

(22) Filed: Jul. 11, 2017

(65) Prior Publication Data
US 2018/0327125 A1    Nov. 15, 2018

(30) Foreign Application Priority Data

May 11, 2017 (CN) .......................... 2017 1 0327755

(51) Int. Cl.
| | | |
|---|---|---|
| *B67B 7/04* | (2006.01) | |
| *B65B 31/08* | (2006.01) | |
| *B67B 7/00* | (2006.01) | |
| *C12H 1/16* | (2006.01) | |
| *C12H 1/14* | (2006.01) | |
| *B67B 1/04* | (2006.01) | |

(52) U.S. Cl.
CPC .............. *B65B 31/08* (2013.01); *B67B 1/045* (2013.01); *B67B 7/385* (2013.01); *C12H 1/14* (2013.01); *C12H 1/16* (2013.01); *B67B 2007/0458* (2013.01)

(58) Field of Classification Search
CPC .... B67B 2007/0458; B65B 31/08; B65B 3/24
USPC ............................ 141/8, 65, 329, 330; 81/3.2
See application file for complete search history.

(56) References Cited

U.S. PATENT DOCUMENTS

| | | | | |
|---|---|---|---|---|
| 5,351,579 A | * | 10/1994 | Metz .................... | B67B 7/0405 30/1.5 |
| 7,743,796 B1 | * | 6/2010 | Schooley ........... | B65D 39/0052 141/351 |
| 2013/0068070 A1 | * | 3/2013 | Mills .................... | B67B 7/0405 81/3.09 |
| 2016/0107871 A1 | * | 4/2016 | Song .................... | B67B 7/0405 81/3.2 |

\* cited by examiner

*Primary Examiner* — Marina A Tietjen
*Assistant Examiner* — Paul J Gray
(74) *Attorney, Agent, or Firm* — Prakash Nama; Global IP Services, PLLC (57) ABSTRACT

The present invention discloses an electric vacuum-pumping and tinfoil-cutting integrated machine. The integrated machine has a housing which comprises a fixed outer housing having an outer housing receiving cavity formed therein and a fixed inner housing having an inner housing receiving cavity formed therein, wherein a PCB and a battery are embedded in the inner housing receiving cavity of the fixed inner housing; and an electric tinfoil-cutting assembly is embedded on an upper end side of the fixed inner housing inside the outer housing receiving cavity of the fixed outer housing, and an electric vacuum-pumping assembly is embedded on a lower end side of the fixed inner housing inside the outer housing receiving cavity of the fixed outer housing. The present invention can achieve a vacuum-pumping function and a tinfoil-cutting function, and has the advantages of novel structural design, diversified functions and convenience in use.

9 Claims, 8 Drawing Sheets

ELECTRIC VACUUM-PUMPING AND TINFOIL-CUTTING INTEGRATED MACHINE

BACKGROUND OF THE INVENTION

The present invention relates to the technical field of auxiliary winebottle opening devices, and in particular to an electric vacuum-pumping and tinfoil-cutting integrated machine.

A wine corkscrew is an auxiliary tool for pulling a winebottle cork out of the bottleneck of a winebottle. A common corkscrew normally comprises a main body for convenient holding by an operator and a screw connected to the main body. When held by hand and rotated, the main body drives the screw to screw into a cork, and then brings the cork out of a winebottle, thereby completing the winebottle opening. However, in actual use, the above-mentioned corkscrew has a lot of defects. For example, in order to open the winebottle, the winebottle must be positioned directly below the screw, and the screw must be located on the axis of the cork as much as possible. The winebottle is then held by the left hand with the right hand rotating and driving the screw into the cork, and the cock cannot be pulled out until the cork rotates relative to the bottleneck. As a result, the winebottle opening process is time-consuming and laborious, and the corkscrew is very inconvenient to use. In order to overcome the defects existing in the above-mentioned manual winebottle opening, electric corkscrews have emerged, and there are various types of electric corkscrew products existing in the prior art.

It is further noted that, a tinfoil cutter is often used to cut the tinfoil on the bottleneck in the process of opening a winebottle; moreover, conventional tinfoil cutters are all operated manually, so that the process is time-consuming and laborious.

Furthermore, in order to prolong the preservation time of the wine and avoid the oxidation of the wine caused by contact with the air in the winebottle, it is necessary to reduce the vacuum degree of the winebottle.

BRIEF SUMMARY OF THE INVENTION

In view of the defects in the prior art, an objective of the present invention is to provide an electric vacuum-pumping and tinfoil-cutting integrated machine which has the advantages of novel structural design, diversified functions and convenience in use, and can achieve a vacuum-pumping function and a tinfoil-cutting function at the same time.

In order to achieve the above-mentioned objective, the present invention is implemented by the following technical solution.

Disclosed is an electric vacuum-pumping and tinfoil-cutting integrated machine, comprising a housing which comprises a fixed outer housing and a fixed inner housing, an outer housing receiving cavity, which is completely through-going from the top down, is formed in the fixed outer housing, the fixed inner housing is embedded in the outer housing receiving cavity of the fixed outer housing, and an inner housing receiving cavity, which is completely through-going from the top down, is formed in the fixed inner housing; a PCB and a battery located on the side of the PCB are embedded in the inner housing receiving cavity of the fixed inner housing and electrically connected to each other;

an electric tinfoil-cutting assembly is embedded on an upper end side of the fixed inner housing inside the outer housing receiving cavity of the fixed outer housing, an electric vacuum-pumping assembly is embedded on a lower end side of the fixed inner housing inside the outer housing receiving cavity of the fixed outer housing; the electric tinfoil-cutting assembly and the electric vacuum-pumping assembly are electrically connected to the PCB respectively; and the electric tinfoil-cutting assembly comprises a tinfoil-cutting reduction gearbox, and a tinfoil-cutting driving motor mounted at a lower end of the tinfoil-cutting reduction gearbox, a power output shaft of the tinfoil-cutting driving motor is connected to a power input end of the tinfoil-cutting reduction gearbox, and the tinfoil-cutting driving motor is electrically connected to the PCB; a tinfoil-cutting movable support is mounted at an upper end of the tinfoil-cutting reduction gearbox, a power output end of the tinfoil-cutting reduction gearbox is connected to the tinfoil-cutting movable support, and a support receiving cavity with an upward opening is formed in the tinfoil-cutting movable support; a blade assembly is embedded in the support receiving cavity of the tinfoil-cutting movable support, the blade assembly comprises a blade-mounting carrier which is embedded in the support receiving cavity, the edge of the blade-mounting carrier is provided with at least two mounting carrier limit notches which both open radially outwardly and are completely through-going from the top down, an internal wall of the support receiving cavity is provided with inwardly raised and wedged support limit projections which correspond to the mounting carrier limit notches, respectively, and each support limit projection is provided with an inclined guide slope and is embedded in a corresponding mounting carrier limit notch; the blade-mounting carrier is provided, corresponding to respective mounting carrier limit notches, with blade-mounting holes which open radially outwardly and communicate with the corresponding mounting carrier limit notches, an L-shaped blade-mounting block is embedded in each blade-mounting hole, each blade-mounting block comprises a horizontally extending horizontal mounting block portion and a vertically extending vertical mounting block portion integrated with the horizontal mounting block portion, the horizontal mounting block portion of each blade-mounting block is embedded in the corresponding blade-mounting hole, an upper end of the vertical mounting block portion of each blade-mounting block extends to an upper end side of the blade-mounting carrier, and a tinfoil-cutting blade is mounted at the upper end of the vertical mounting block portion of each blade-mounting block; and a horizontal spring is embedded in each blade-mounting hole on the inner side of the horizontal mounting block portion of the corresponding blade-mounting block, an inner end of each horizontal spring abuts against the blade-mounting carrier, and an outer end of each horizontal spring abuts against the horizontal mounting block portion of the corresponding blade-mounting block.

An annular protective cover is buckled at the upper end of the tinfoil-cutting movable support, and the protective cover is provided with a protective flange which protrudes and extends inwardly and is located at the upper end side of the tinfoil-cutting blades.

The tinfoil-cutting reduction gearbox can be embedded in the outer housing receiving cavity of the fixed outer housing in a manner capable of moving up and down relatively, a tinfoil-cutting reset spring is mounted between the tinfoil-cutting reduction gearbox and the fixed inner housing, an upper end of the tinfoil-cutting reset spring abuts against the lower end of the tinfoil-cutting reduction gearbox, and a lower end thereof abuts against the upper end of the fixed inner housing; the upper end of the fixed inner housing is provided with an upwardly raised spring guide pin corresponding to the tinfoil-cutting reset spring, and the lower end of the tinfoil-cutting reset spring is sleeved at the periphery of the spring guide pin; the upper end of the fixed outer housing is provided with an upper end anti-disengagement limit notch on the internal wall of the outer housing receiving cavity, the upper end of the tinfoil-cutting reduction gearbox is provided with an upper end anti-disengagement limit projection which is embedded in the upper end anti-disengagement limit notch, and an upper end edge of the upper end anti-disengagement limit projection abuts against an upper end edge of the upper end anti-disengagement limit notch.

A lower end of the tinfoil-cutting driving motor extends in the inner housing receiving cavity of the fixed inner housing, the PCB is provided with a tinfoil-cutting trigger switch located on the lower end side of the tinfoil-cutting driving motor, and the tinfoil-cutting trigger switch is electrically connected to the PCB; when the tinfoil-cutting driving motor comes into contact with the tinfoil-cutting trigger switch, the PCB controls the tinfoil-cutting driving motor to start.

The electric vacuum-pumping assembly comprises a vacuum pump case which comprises a lower vacuum pump case and an upper vacuum pump case mounted at an upper end of the lower vacuum pump case, a vacuum pump receiving cavity is formed between the lower vacuum pump case and the upper vacuum pump case, a vacuum-pumping driving motor electrically connected to the PCB is mounted at an upper end of the upper vacuum pump case, and a power output shaft of the vacuum-pumping driving motor passes downwardly through the upper vacuum pump case and extends into the vacuum pump receiving cavity; a lower seal cover, an upper seal cover and a leather cup support, which are successively connected to each other from the top down and are successively clamped between the lower vacuum pump case and the upper vacuum pump case, are embedded in the vacuum pump receiving cavity, and a vacuum-pumping piston is clamped between the upper seal cover and the leather cup support;

a vacuum-pumping cavity and an air outlet cavity which are arranged as spaced apart are formed between the lower seal cover and the upper seal cover, a piston cavity is formed between the vacuum-pumping piston and the upper seal cover, a lower cover locating hole with a downward opening is formed in a lower surface of the lower vacuum pump case, a lower case air pumping hole, which is completely through-going from the top down and communicates with the lower cover locating hole, is formed in an upper end of the lower vacuum pump case, the lower seal cover is provided with a lower cover air pumping hole configured to communicate the vacuum-pumping cavity with the lower case air pumping hole and a lower cover air outlet hole communicated with the air outlet cavity, the upper seal cover is provided with an air pumping one-way hole configured to communicate the vacuum-pumping cavity with the piston cavity and an air outlet one-way hole configured to communicate the piston cavity with the air outlet cavity, and the upper seal cover is provided with an air pumping one-way valve corresponding to the air pumping one-way hole, and an air outlet one-way valve corresponding to the air outlet one-way hole; and the vacuum-pumping piston is provided with a swing seat which is in driving connection to the vacuum-pumping piston, and an upper end of the swing seat is connected to the power output shaft of the vacuum-pumping driving motor by a rotating shaft.

The vacuum pump case can be embedded in the outer housing receiving cavity of the fixed outer housing in a manner capable of moving up and down relatively, an upper case shoulder is arranged at a lower end edge of the upper vacuum pump case, a vacuum-pumping reset spring is sleeved at the periphery of the upper vacuum pump case, and a lower end of the vacuum-pumping reset spring abuts against a lower case shoulder and an upper end thereof abuts against the lower end of the fixed inner housing; the lower end of the fixed outer housing is provided with a lower end anti-disengagement limit notch on the internal wall of the outer housing receiving cavity, the edge of upper case shoulder of the upper vacuum pump case is provided with a lower end anti-disengagement limit projection which is embedded in the lower end anti-disengagement limit notch, and a lower end edge of the lower end anti-disengagement limit projection abuts against a lower end edge of the lower end anti-disengagement limit notch.

An upper end of the vacuum-pumping driving motor extends in the inner housing receiving cavity of the fixed inner housing, the PCB is provided with a vacuum-pumping trigger switch located on the upper end side of the vacuum-pumping driving motor, and the vacuum-pumping trigger switch is electrically connected to the PCB; when the vacuum-pumping driving motor comes into contact with the vacuum-pumping trigger switch, the PCB controls the vacuum-pumping driving motor to start.

The battery is a rechargeable battery.

The PCB is provided with a charging port which is electrically connected to the PCB, the fixed outer housing and the fixed inner housing are respectively provided with a charging jack which is completely through-going from the top down and aligned with the charging port.

The present invention has the following beneficial effects that an electric vacuum-pumping and tinfoil-cutting integrated machine disclosed by the present invention comprises a housing which comprises a fixed outer housing and a fixed inner housing, an outer housing receiving cavity, which is completely through-going from the top down, is formed in the fixed outer housing, the fixed inner housing is embedded in the outer housing receiving cavity of the fixed outer housing, and an inner housing receiving cavity, which is completely through-going from the top down, is formed in the fixed inner housing; a PCB and a battery located on the side of the PCB are embedded in the inner housing receiving cavity of the fixed inner housing and electrically connected to each other; an electric tinfoil-cutting assembly is embedded on an upper end side of the fixed inner housing inside the outer housing receiving cavity of the fixed outer housing, an electric vacuum-pumping assembly is embedded on a lower end side of the fixed inner housing inside the outer housing receiving cavity of the fixed outer housing; the electric tinfoil-cutting assembly and the electric vacuum-pumping assembly are electrically connected to the PCB respectively; the electric tinfoil-cutting assembly comprises a tinfoil-cutting reduction gearbox, a tinfoil-cutting driving motor mounted at a lower end of the tinfoil-cutting reduction gearbox, a power output shaft of the tinfoil-cutting driving motor is connected to a power input end of the tinfoil-cutting reduction gearbox, and the tinfoil-cutting driving motor is electrically connected to the PCB; a tinfoil-cutting movable support is mounted at an upper end of the tinfoil-cutting reduction gearbox, a power output end of the tinfoil-cutting reduction gearbox is connected to the tinfoil-cutting movable support, and a support receiving cavity with an upward opening is formed in the tinfoil-cutting movable support; a blade assembly is embedded in the support receiving cavity of the tinfoil-cutting movable support, the blade assembly comprises a blade-mounting carrier which is embedded in the support receiving cavity, the edge of the blade-mounting carrier is provided with at least two mounting carrier limit notches which both open radially outwardly and are completely through-going from the top down, an internal wall of the support receiving cavity is provided with inwardly raised and wedged support limit projection which correspond to the mounting carrier limit notches, respectively, and each support limit projection is provided with an inclined guide slope and is embedded in a corresponding mounting carrier limit notch; the blade-mounting carrier is provided, corresponding to respective mounting carrier limit notches, with blade-mounting holes which open radially outwardly and communicate with the corresponding mounting carrier limit notches, an L-shaped blade-mounting block is embedded in each blade-mounting hole, each blade-mounting block comprises a horizontally extending horizontal mounting block portion and a vertically extending vertical mounting block portion integrated with the horizontal mounting block portion, the horizontal mounting block portion of each blade-mounting block is embedded in the corresponding blade-mounting hole, an upper end of the vertical mounting block portion of each blade-mounting block extends to an upper end side of the blade-mounting carrier, and a tinfoil-cutting blade is mounted at the upper end of the vertical mounting block portion of each blade-mounting block; and a horizontal spring is embedded in each blade-mounting hole on the inner side of the horizontal mounting block portion of the corresponding blade-mounting block, an inner end of each horizontal spring abuts against the blade-mounting carrier, and an outer end of each horizontal spring abuts against the horizontal mounting block portion of the corresponding blade-mounting block. According to the above-mentioned structure design, the present invention has the advantages of novel structural design, diversified functions and convenience in use and can achieve a vacuum-pumping function and a tinfoil-cutting function at the same time.

BRIEF DESCRIPTION OF THE DRAWINGS

The present invention will be further described below with reference to the drawings, but the embodiments in the drawings are not meant to limit the present invention in any way.

Included in FIG. 1 to FIG. 8 are:

| | |
|---|---|
| 1-Integrated machine housing | 11-Fixed outer housing |
| 111-Outer housing receiving cavity | 112-Upper end anti-disengagement limit notch |
| 113-Lower end anti-disengagement limit notch | 12-Fixed inner housing |
| 121-Inner housing receiving cavity | 122-Spring guide pin |
| 13-Charging jack | 2-PCB |
| 21-Tinfoil-cutting trigger switch | 22-Vacuum-pumping trigger switch |
| 23-Charging port | 3-Battery |
| 4-Electric tinfoil-cutting assembly | 41-Tinfoil-cutting reduction gearbox |
| 411-Upper end anti-disengagement limit projection | 42-Tinfoil-cutting driving motor |
| 43-Tinfoil-cutting movable support | 431-Support receiving cavity |
| 432-Support limit projection | 4321-Inclined guide slope |
| 44-Blade-mounting carrier | 441-Mounting carrier limit notch |
| 442-Blade-mounting hole | 45-Blade-mounting block |
| 451-Horizontal mounting block portion | 452-Vertical mounting block portion |
| 46-Tinfoil-cutting blade | 47-Horizontal spring |
| 48-Annular protective cover | 481-Protective flange |
| 49-Tinfoil-cutting reset spring | 5-Electric vacuum-pumping assembly |
| 51-Vacuum pump case | 511-Lower vacuum pump case |
| 5111-Lower case locating hole | 512-Upper vacuum pump case |
| 5121-Upper case shoulder | 5122-Lower end anti-disengagement limit projection |
| 513-Vacuum pump receiving cavity | 52-Vacuum-pumping driving motor |
| 53-Lower seal cover | 54-Upper seal cover |
| 55-Leather cup support | 56-Vacuum-pumping piston |
| 571-Vacuum-pumping cavity | 572-Air outlet cavity |
| 573-Piston cavity | 574-Lower case air pumping hole |
| 575-Lower cover air pumping hole | 576-Air pumping one-way hole |
| 577-Air pumping one-way valve | 578-Air outlet one-way valve |
| 581-Swing seat | 582-Rotating shaft |
| 59-Vacuum-pumping reset spring. | |

DETAILED DESCRIPTION OF THE INVENTION

The present invention will be described below with reference to specific embodiments.

As shown in FIG. 1 to FIG. 7, disclosed is an electric vacuum-pumping and tinfoil-cutting integrated machine, comprising a housing 1 which comprises a fixed outer housing 11 and a fixed inner housing 12, an outer housing receiving cavity 111, which is completely through-going from the top down, is formed in the fixed outer housing 11, the fixed inner housing 12 is embedded in the outer housing receiving cavity 111 of the fixed outer housing 11, and an inner housing receiving cavity 121, which is completely through-going from the top down, is formed in the fixed inner housing 12. A PCB 2 and a battery 3 located on the side of the PCB 2 are embedded in the inner housing receiving cavity 121 of the fixed inner housing 12 and electrically connected to each other.

An electric tinfoil-cutting assembly 4 is embedded on an upper end side of the fixed inner housing 12 inside the outer housing receiving cavity 111 of the fixed outer housing 11, and an electric vacuum-pumping assembly 5 is embedded on a lower end side of the fixed inner housing 12 inside the outer housing receiving cavity 111 of the fixed outer housing 11; the electric tinfoil-cutting assembly 4 and the electric vacuum-pumping assembly 5 are electrically connected to the PCB 2 respectively.

Further, the electric tinfoil-cutting assembly 4 comprises a tinfoil-cutting reduction gearbox 41, a tinfoil-cutting driving motor 42 mounted at a lower end of the tinfoil-cutting reduction gearbox 41, a power output shaft of the tinfoil-cutting driving motor 42 is connected to a power input end of the tinfoil-cutting reduction gearbox 41, and the tinfoil-cutting driving motor 42 is electrically connected to the PCB 2. A tinfoil-cutting movable support 43 is mounted at an upper end of the tinfoil-cutting reduction gearbox 41, a power output end of the tinfoil-cutting reduction gearbox 41 is connected to the tinfoil-cutting movable support 43, and a support receiving cavity 431 with an upward opening is formed in the tinfoil-cutting movable support 43. A blade assembly is embedded in the support receiving cavity 431 of the tinfoil-cutting movable support 43, the blade assembly comprises a blade-mounting carrier 44 which is embedded in the support receiving cavity 431, the edge of the blade-mounting carrier 44 is provided with at least two mounting carrier limit notches 441 which both open radially outwardly and are completely through-going from the top down, an internal wall of the support receiving cavity 431 is provided with inwardly raised and wedged support limit projections 432 which correspond to the mounting carrier limit notches 441, respectively, and each support limit projection 432 is provided with an inclined guide slope 4321 and is embedded in a corresponding mounting carrier limit notch 441. The blade-mounting carrier 44 is provided, corresponding to respective mounting carrier limit notches 441, with blade-mounting holes 442 which open radially outwardly and communicate with the corresponding mounting carrier limit notches 441, an L-shaped blade-mounting block 45 is embedded in each blade-mounting hole 442, each blade-mounting block 45 comprises a horizontal mounting block portion 451 extending horizontally and a vertical mounting block portion 452 integrated with the horizontal mounting block portion 451 and extending vertically, the horizontal mounting block portion 451 of each blade-mounting block 45 is embedded in the corresponding blade-mounting hole 442, an upper end of the vertical mounting block portion 452 of each blade-mounting block 45 extends to an upper end side of the blade-mounting carrier 44, and a tinfoil-cutting blade 46 is mounted at the upper end of the vertical mounting block portion 452 of each blade-mounting block 45; and a horizontal spring 47 is embedded in each blade-mounting hole 442 on the inner side of the horizontal mounting block portion 451 of the corresponding blade-mounting block 45, an inner end of each horizontal spring 7 abuts against the blade-mounting carrier 44, and an outer end of each horizontal spring 7 abuts against the horizontal mounting block portion 451 of the corresponding blade-mounting block 45.

As for the electric tinfoil-cutting assembly 4, preferably, the tinfoil-cutting reduction gearbox can be embedded in the outer housing receiving cavity 111 of the fixed outer housing 11 in a manner capable of moving up and down relatively, a tinfoil-cutting reset spring 49 is mounted between the tinfoil-cutting reduction gearbox and the fixed inner housing 12, an upper end of the tinfoil-cutting reset spring 49 abuts against the lower end of the tinfoil-cutting reduction gearbox 41, and a lower end thereof abuts against the upper end of the fixed inner housing 12; the upper end of the fixed inner housing 12 is provided with an upwardly raised spring guide pin 122 corresponding to the tinfoil-cutting reset spring 49, and the lower end of the tinfoil-cutting reset spring 49 is sleeved at the periphery of the spring guide pin 122. The upper end of the fixed outer housing 11 is provided with an upper end anti-disengagement limit notch 112 on the internal wall of the outer housing receiving cavity 111, the upper end of the tinfoil-cutting reduction gearbox 41 is provided with an upper end anti-disengagement limit projection 411 which is embedded in the upper end anti-disengagement limit notch 112, and an upper end edge of the upper end anti-disengagement limit projection 411 abuts against an upper end edge of the upper end anti-disengagement limit notch 112. A lower end of the tinfoil-cutting driving motor 42 extends in the inner housing receiving cavity 121 of the fixed inner housing 12, the PCB 2 is provided with a tinfoil-cutting trigger switch 21 located on the lower end side of the tinfoil-cutting driving motor 42, and the tinfoil-cutting trigger switch 21 is electrically connected to the PCB 2. When the tinfoil-cutting driving motor 42 comes into contact with the tinfoil-cutting trigger switch 21, the PCB 2 controls the tinfoil-cutting driving motor 42 to start.

Figure 1:
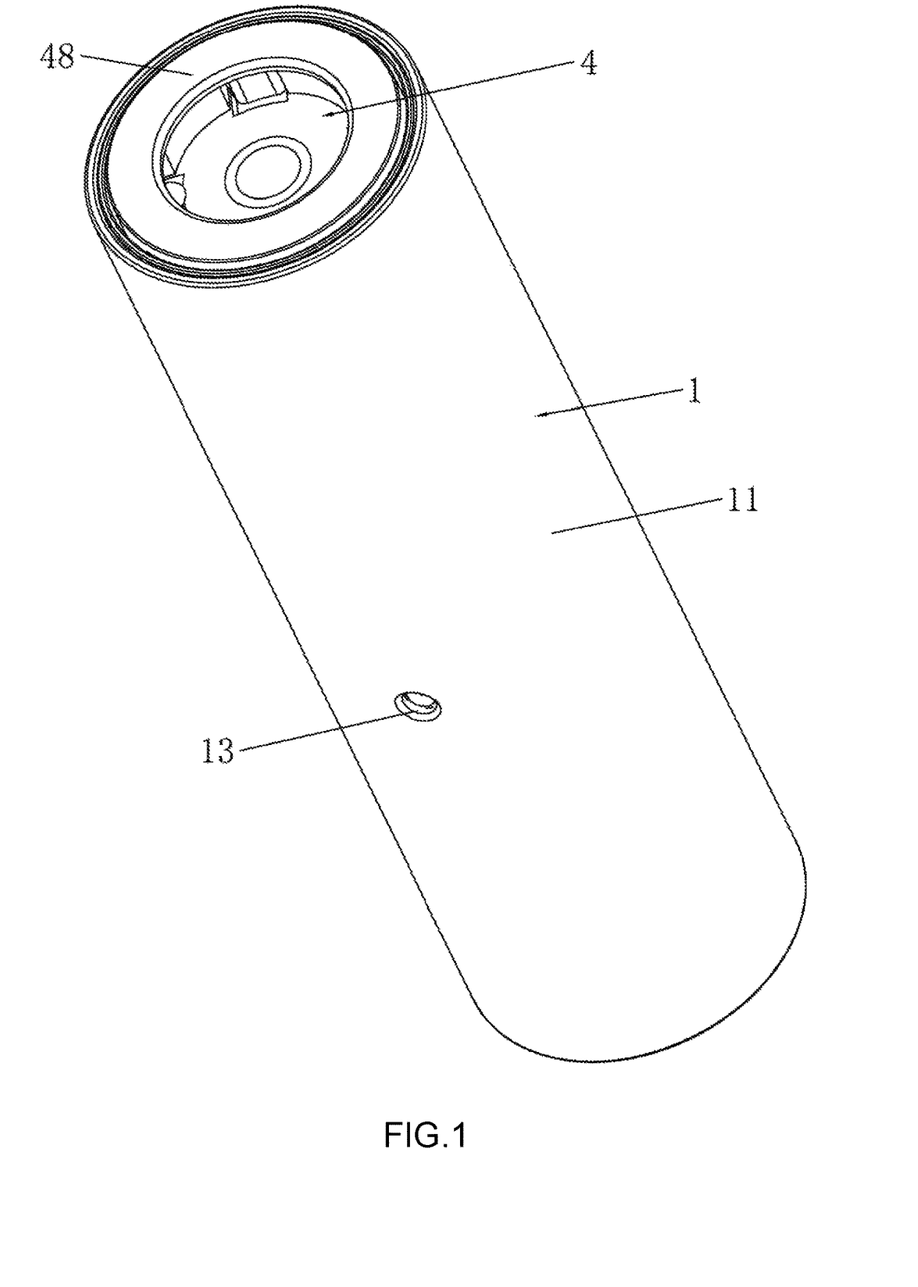
FIG. 1 is a structure diagram of the present invention.
Figure 2:
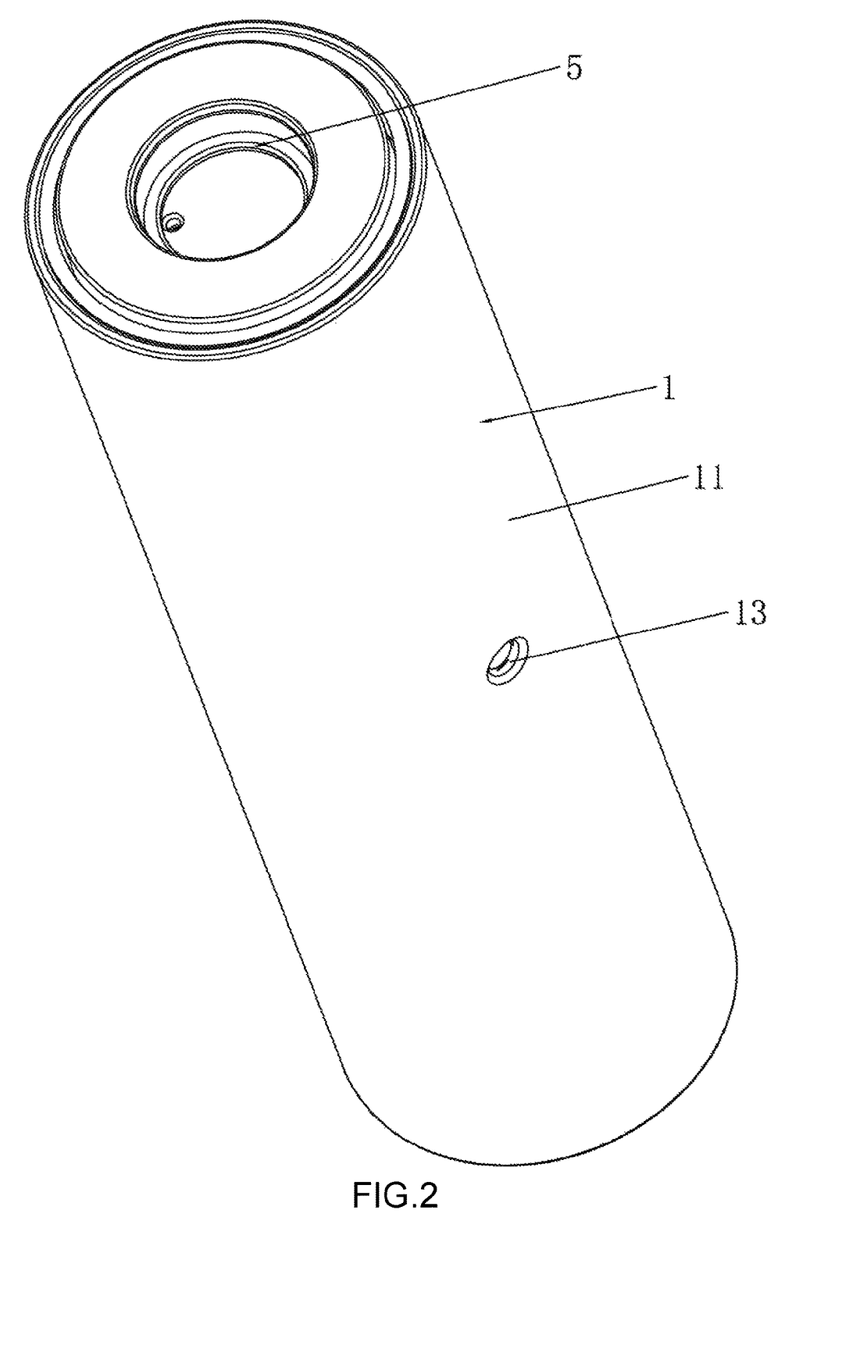
FIG. 2 is a structure diagram of the present invention from another view.
Figure 3:
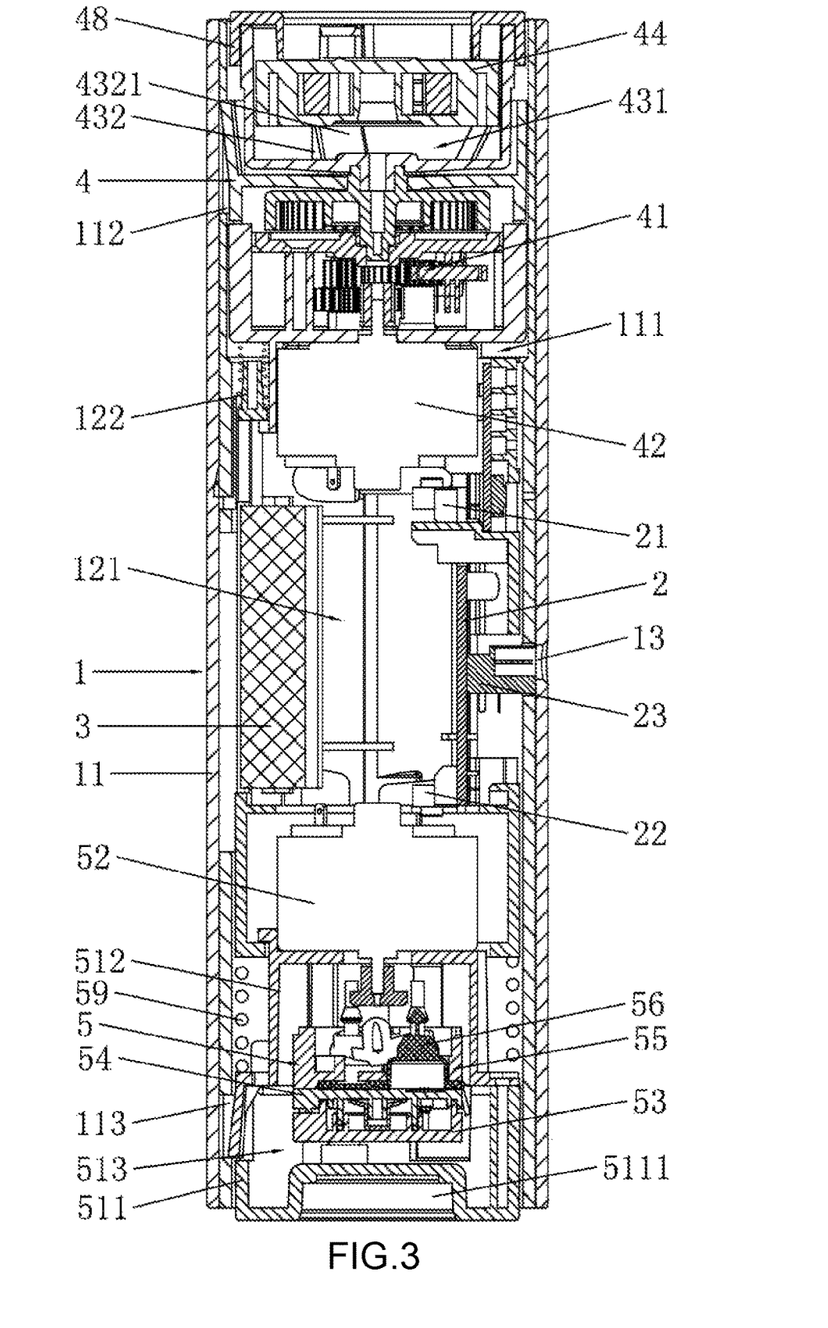
FIG. 3 is a cross-sectional view of the present invention.
Figure 4:
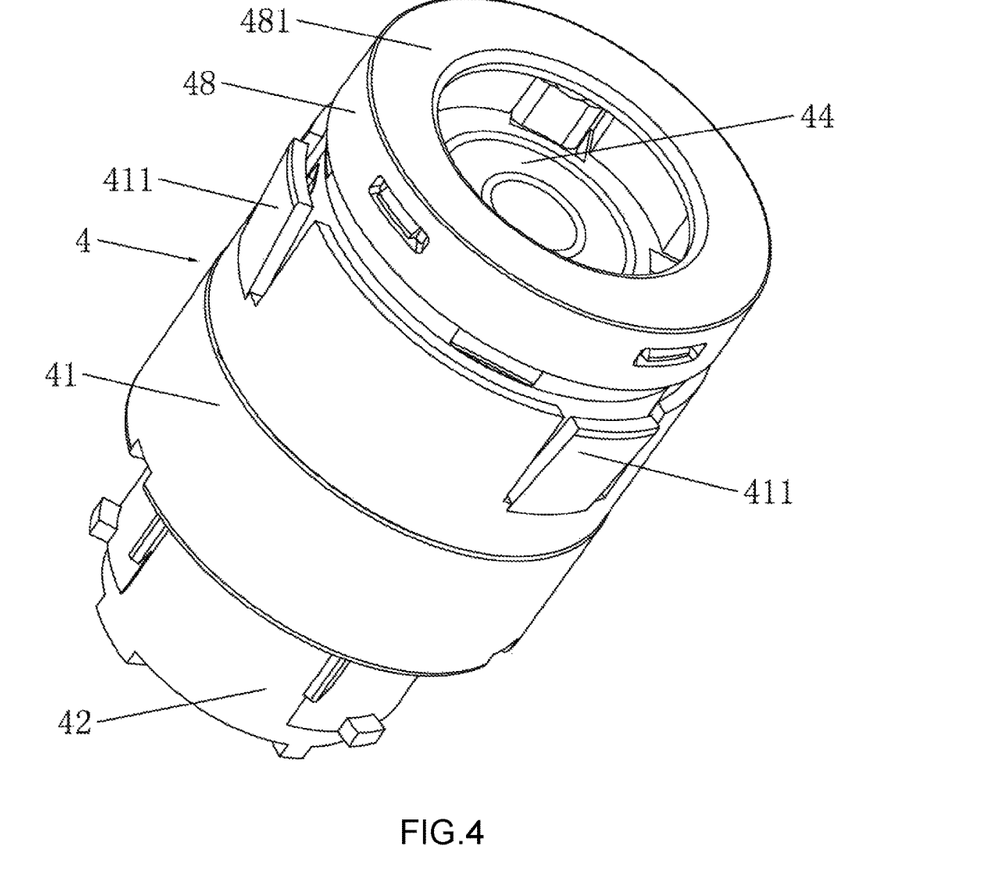
FIG. 4 is a structure diagram of an electric tinfoil-cutting assembly of the present invention.
Figure 5:
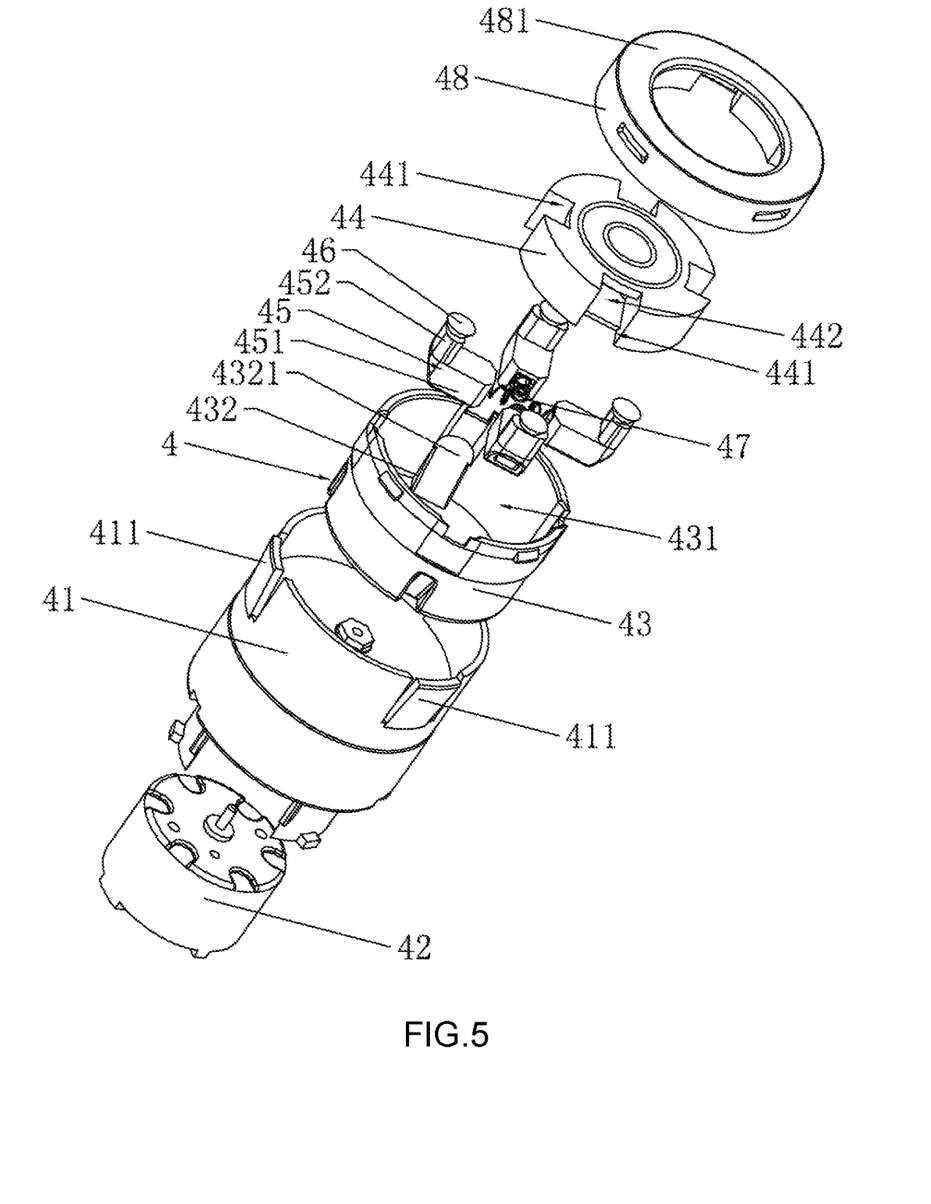
FIG. 5 is an exploded view of the electric tinfoil-cutting assembly of the present invention.
Figure 6:
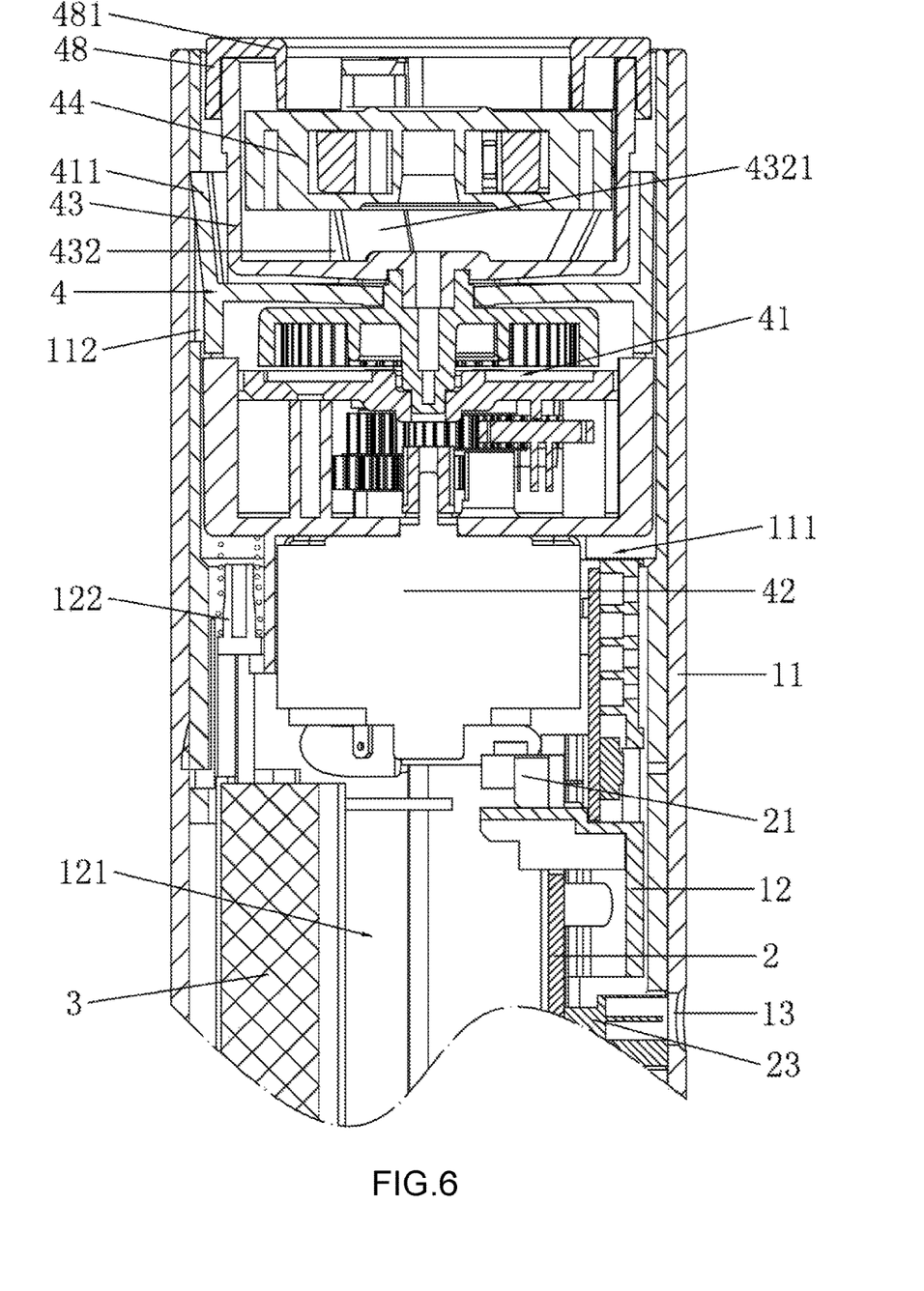
FIG. 6 is a cross-sectional view of the electric tinfoil-cutting assembly of the present invention.
Figure 7:
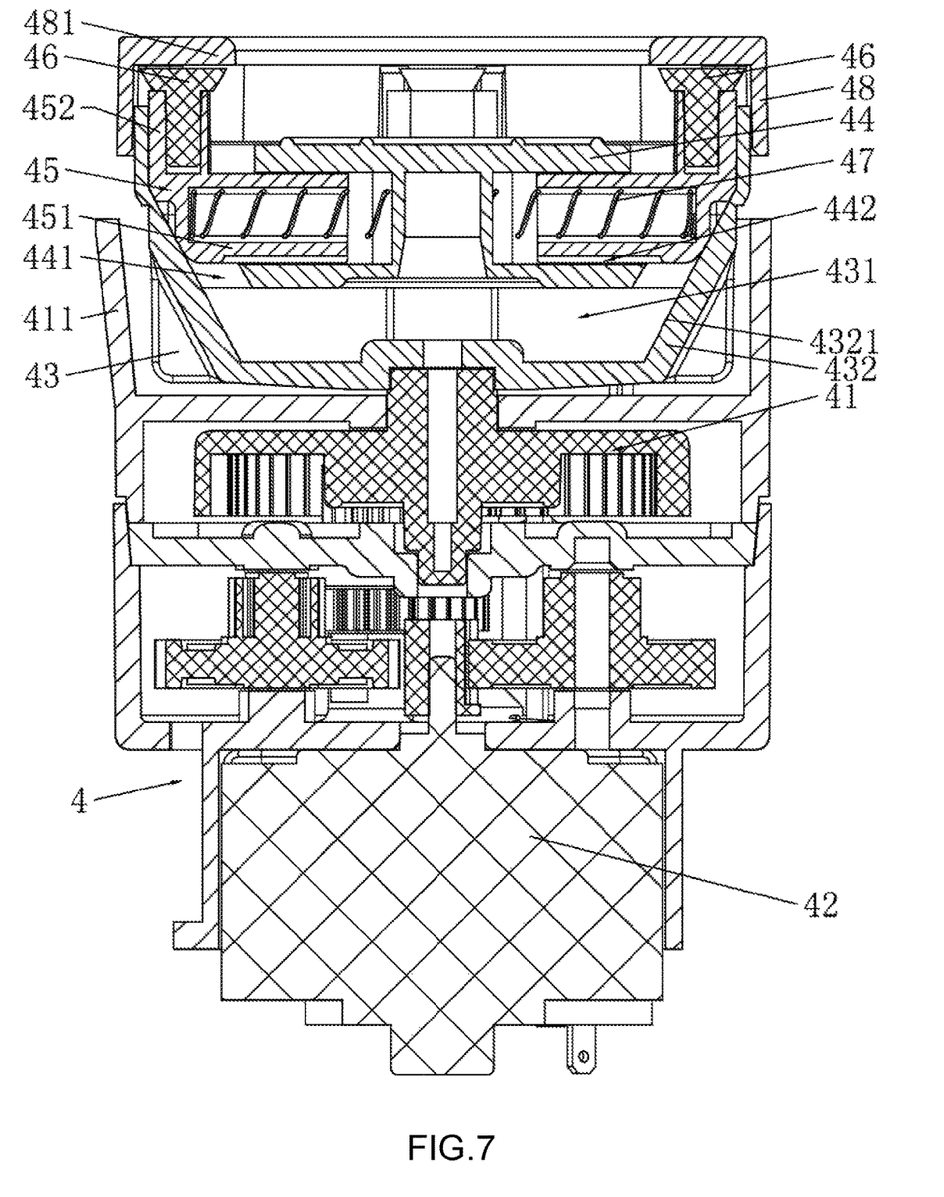
FIG. 7 is a cross-sectional view at another location of the electric tinfoil-cutting assembly of the present invention.
Figure 8:
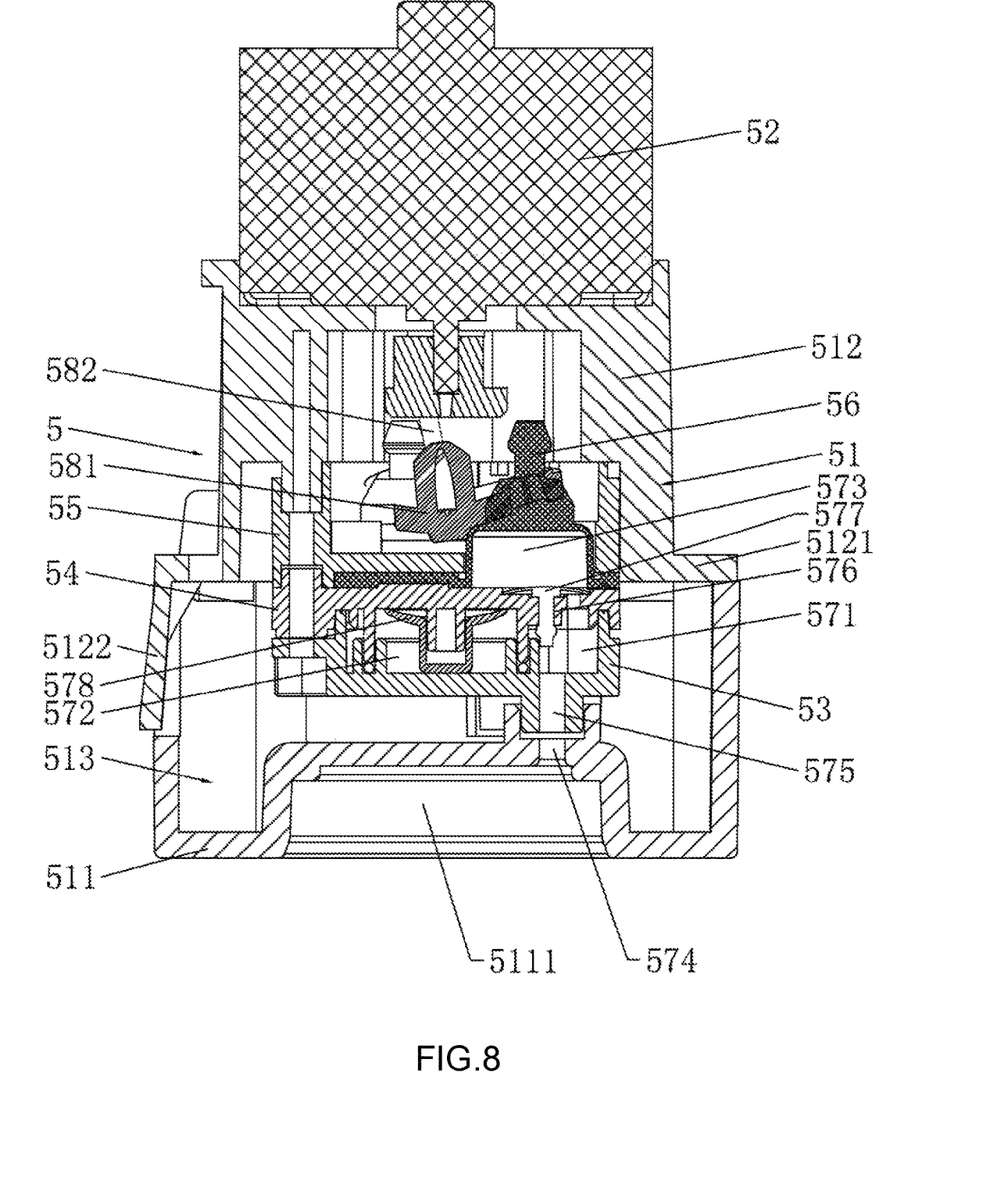
FIG. 8 is a cross-sectional view of an electric vacuum-pumping assembly of the present invention.

Furthermore, the electric vacuum-pumping assembly 5 comprises a vacuum pump case 51 which comprises a lower vacuum pump case 511 and an upper vacuum pump case 512 mounted at an upper end of the lower vacuum pump case 511, a vacuum pump receiving cavity 513 is formed between the lower vacuum pump case 511 and the upper vacuum pump case 512, a vacuum-pumping driving motor 52 electrically connected to the PCB 2 is mounted at an upper end of the upper vacuum pump case 512, and a power output shaft of the vacuum-pumping driving motor 52 passes downwardly through the upper vacuum pump case 512 and extends into the vacuum pump receiving cavity 513. A lower seal cover 53, an upper seal cover 54 and a leather cup support 55, which are successively connected to each other from the top down and are successively clamped between the lower vacuum pump case 511 and the upper vacuum pump case 512, are embedded in the vacuum pump receiving cavity 513, and a vacuum-pumping piston 56 is clamped between the upper seal cover 54 and the leather cup support 55. A vacuum-pumping cavity 571 and an air outlet cavity 572 which are arranged as spaced apart are formed between the lower seal cover 53 and the upper seal cover 54, a piston cavity 573 is formed between the vacuum-pumping piston 56 and the upper seal cover 54, a lower cover locating hole with a downward opening is formed in a lower surface of the lower vacuum pump case 511, a lower case air pumping hole 574, which is completely through-going from the top down and communicates with the lower cover locating hole, is formed at an upper end of the lower vacuum pump case 511, the lower seal cover 53 is provided with a lower cover air pumping hole 575 configured to communicate the vacuum-pumping cavity 571 with the lower case air pumping hole 574 and a lower cover air outlet hole communicated with the air outlet cavity 572, the upper seal cover 54 is provided with an air pumping one-way hole 576 configured to communicate the vacuum-pumping cavity 571 with the piston cavity 573 and an air outlet one-way hole configured to communicate the piston cavity 573 with the air outlet cavity 572, and the upper seal cover 54 is provided with an air pumping one-way valve 577 corresponding to the air pumping one-way hole 576 and an air outlet one-way valve 56 corresponding to the air outlet one-way hole. The vacuum-pumping piston 56 is provided with a swing seat 581 which is in driving connection to the vacuum-pumping piston 56, and an upper end of the swing seat 581 is connected to the power output shaft of the vacuum-pumping driving motor 52 by a rotating shaft 582.

As for the electric vacuum-pumping assembly 5, preferably, the vacuum pump case 51 can be embedded in the outer housing receiving cavity 111 of the fixed outer housing 11 in a manner capable of moving up and down relatively, an upper case shoulder 5121 is arranged at a lower end edge of the upper vacuum pump case 512, a vacuum-pumping reset spring 59 is sleeved at the periphery of the upper vacuum pump case 512, and a lower end of the vacuum-pumping reset spring 59 abuts against a lower case shoulder and an upper end thereof abuts against the lower end of the fixed inner housing 12. The lower end of the fixed outer housing 11 is provided with a lower end anti-disengagement limit notch 113 on the internal wall of the outer housing receiving cavity 111, the edge of upper case shoulder 5121 of the upper vacuum pump case 512 is provided with a lower end anti-disengagement limit projection 5122 which is embedded in the lower end anti-disengagement limit notch 113, and a lower end edge of the lower end anti-disengagement limit projection 5122 abuts against a lower end edge of the lower end anti-disengagement limit notch 113. An upper end of the vacuum-pumping driving motor 52 extends in the inner housing receiving cavity 121 of the fixed inner housing 12, the PCB 2 is provided with a vacuum-pumping trigger switch 22 located on the upper end side of the vacuum-pumping driving motor 52, and the vacuum-pumping trigger switch 22 is electrically connected to the PCB 2. When the vacuum-pumping driving motor 52 comes into contact with the vacuum-pumping trigger switch 22, the PCB 2 controls the vacuum-pumping driving motor 52 to start.

As for the electric tinfoil-cutting assembly 4 of the present invention, since the tinfoil-cutting reduction gearbox 41 can be embedded in the outer housing receiving cavity 111 in a manner capable of moving up and down relatively, when a tinfoil-cutting operation is not required, the upper end edge of the upper end anti-disengagement limit projection 411 abuts against the upper end edge of the upper end anti-disengagement limit notch 112 due to the elastic force of the tinfoil-cutting reset spring 49, and the upper end anti-disengagement limit projection 411 cooperates with the upper end anti-disengagement limit notch to limit the electric tinfoil-cutting assembly 4, thereby playing a role of anti-disengagement limit. During tinfoil-cutting operation by using the present invention, the whole integrated machine housing 1 is inverted, the bottleneck of a winebottle is put in between the tinfoil-cutting blades 46, the fixed outer housing 11 is pressed downward such that the bottleneck of the winebottle upwardly pushes the blade-mounting carrier 44, and under the pushing action of the bottleneck of the winebottle, the blade-mounting carrier 44 moves towards the bottom of the support receiving cavity 431. In this process, under the guiding action of the inclined guide slopes 4321 of the support limit projections 432, each blade-mounting block 45 gradually moves inwards, and each blade-mounting block 45 drives the corresponding tinfoil-cutting blade 46 to move inwards synchronously until the edge of each tinfoil-cutting blade 6 is finally in contact with a tinfoil on the periphery of the bottleneck of the winebottle. After that, the fixed outer housing 11 is continuously pressed downward, the whole electric tinfoil-cutting assembly 4 moves towards the side of the fixed inner housing 12 relatively to the fixed outer housing 11 until the tinfoil-cutting driving motor 42 is finally in contact with the tinfoil-cutting trigger switch 21. After the tinfoil-cutting driving motor 42 is in contact with the tinfoil-cutting trigger switch 21, the PCB controls the tinfoil-cutting driving motor 42 to start. The tinfoil-cutting driving motor 42 drives the tinfoil-cutting movable support 43 to rotate after being decelerated by the tinfoil-cutting reduction gearbox 41, the tinfoil-cutting movable support 43 drives the blade-mounting carrier 44 to rotate synchronously, the rotating blade-mounting carrier 44 drives each blade-mounting block 45 and each tinfoil-cutting blade 6 to rotate, and the rotating tinfoil-cutting blades 6 carry out tinfoil-cutting. After the tinfoil-cutting operation is completed, the inverted integrated machine housing 1 is lifted up and the bottleneck of the winebottle is removed from the blade-mounting carrier 44. Under the action of the restoring elastic force of the horizontal springs 47, each horizontal spring 47 outwardly pushes the horizontal mounting block portion 451 of each blade-mounting block 45, each blade-mounting block 45 drives the corresponding tinfoil-cutting blade 46 to move outwards, and moreover, due to the guiding action of the inclined guide slopes 4321, the tinfoil-cutting blades 46, the blade-mounting blocks 45 and the blade-mounting carrier 44 return to the initial positions, and the tinfoil-cutting reset spring 49 drives the whole electric tinfoil-cutting assembly 4 to return to the initial position.

As for the electric vacuum-pumping assembly 5, when needing to preserve the unfinished wine, the user can carry out a vacuum-pumping operation on the winebottle by means of the electric vacuum-pumping assembly 5 and pump the air out of the winebottle by means of the electric vacuum-pumping assembly 5 so as to prolong the preservation time of the wine. As the vacuum pump case 51 can be embedded in the outer housing receiving cavity 111 in a manner capable of moving up and down relatively, when a vacuum-pumping operation is not required, the lower end edge of the lower end anti-disengagement limit projection 5122 abuts against the lower end edge of the lower end anti-disengagement limit notch 113 due to the elastic force of the vacuum-pumping reset spring 59, and the lower end anti-disengagement limit projection 5122 cooperates with the lower end anti-disengagement limit notch to limit the electric vacuum-pumping assembly 5, thereby playing a role of anti-disengagement limit. During the vacuum-pumping operation by using the electric vacuum-pumping assembly 5, the lower case locating hole 5111 of the lower vacuum pump case 511 is directed at the bottleneck of the winebottle and then located, the fixed outer housing 11 is pressed downward such that the lower vacuum pump case 511 pushes a winebottle cork downwardly which reacts on and pushes the lower vacuum pump case 511 upwardly, and under the action of the reacting force of the winebottle cork, the whole electric vacuum-pumping assembly 5 moves upwardly relatively to the fixed outer housing 11. After the electric vacuum-pumping assembly 5 moves to a certain position, the vacuum-pumping driving motor 52 will be in contact with the vacuum-pumping trigger switch 22 of the PCB 2, the PCB 2 controls the vacuum-pumping driving motor 52 to start. The vacuum-pumping driving motor 52 drives the swing seat 581 to swing by means of the rotating shaft 582, and under the swinging action of the swing seat 581, the vacuum-pumping piston 56 is driven to reciprocate up and down. When the vacuum-pumping piston 56 is in an upward stroke, the piston cavity 573 generates a negative pressure such that the air in the winebottle enters the piston cavity 573 after passing through the lower case air pumping hole 574, the lower cover air pumping hole 575, the vacuum-pumping cavity 571 and the air pumping one-way hole 576 successively. In this process, the air outlet one-way valve 578 blocks the air outlet one-way hole. When the vacuum-pumping piston 56 is in a downward stroke, the air in the piston cavity 573 is compressed to form a high pressure, and at this moment, the high pressure air in the piston cavity 573 exhausts from the air outlet one-way hole, the air outlet cavity 572 and the upper cover air outlet hole. In this process, the air pumping one-way valve 577 blocks the air pumping one-way hole 576. After the vacuum-pumping operation is completed, the integrated machine housing 1 is lifted up and the bottleneck of the winebottle is removed from the lower case locating hole 5111. Under the action of the restoring elastic force of the vacuum-pumping reset spring 59, the vacuum pump case 51 moves downwards to return to the initial state.

It can be known from the above that, according to the above-mentioned structure design, the present invention can achieve a vacuum-pumping function and a tinfoil-cutting function at the same time, i.e., the present invention has the advantages of novel structural design, diversified functions and convenience in use.

As a preferred embodiment, as shown in FIGS. 1, 3, 4, 5, 6 and 7, an annular protective cover 48 is buckled at the upper end of the tinfoil-cutting movable support 43, and the protective cover 48 is provided with a protective flange 481 which protrudes and extends inwardly and is located at the upper end side of the tinfoil-cutting blades 46. During operation of the present invention, the protective flange 481 of the protective cover 48 extends to the upper end side of each tinfoil-cutting blade 46 to hide each tinfoil-cutting blade 46, so that such structure design can effectively improve the safety of the present invention and avoid accidental cuts.

As a preferred embodiment, as shown in FIGS. 1, 2, 3 and 6, the battery 3 is a rechargeable battery. Further, the PCB 2 is provided with a charging port 23 which is electrically connected to the PCB 2, the fixed outer housing 11 and the fixed inner housing 12 are respectively provided with a charging jack 13 which is completely through-going from the top down and aligned with the charging port 23. During operation of the present invention, when the battery 3 is low in power, the user can connect the battery to the charging port 23 through a corresponding charging cable to charge the battery 3.

The above are merely preferred embodiments of the present invention. For the ordinary skilled in the art, both the specific embodiments and the application range will be altered according to the concept of the present invention, and the content of the specification should not be interpreted as a limitation on the present invention.

What is claimed is:

1. An electric vacuum-pumping and tinfoil-cutting integrated machine, characterized in that it comprises a housing (1) which comprises a fixed outer housing (11) and a fixed inner housing (12), an outer housing receiving cavity (111), which is completely through-going from the top down, is formed in the fixed outer housing (11), the fixed inner housing (12) is embedded in the outer housing receiving cavity (111) of the fixed outer housing (11), and an inner housing receiving cavity (121), which is completely through-going from the top down, is formed in the fixed inner housing (12); a PCB (2) and a battery (3) located on the side of the PCB (2) are embedded in the inner housing receiving cavity (121) of the fixed inner housing (12) and electrically connected to each other;

an electric tinfoil-cutting assembly (4) is embedded on an upper end side of the fixed inner housing (12) inside the outer housing receiving cavity (111) of the fixed outer housing (11), and an electric vacuum-pumping assembly (5) is embedded on a lower end side of the fixed inner housing (12) inside the outer housing receiving cavity (111) of the fixed outer housing (11); the electric tinfoil-cutting assembly (4) and the electric vacuum-pumping assembly (5) are electrically connected to the PCB (2) respectively; and the electric tinfoil-cutting assembly (4) comprises a tinfoil-cutting reduction gearbox (41), a tinfoil-cutting driving motor (42) mounted at a lower end of the tinfoil-cutting reduction gearbox (41), a power output shaft of the tinfoil-cutting driving motor (42) is connected to a power input end of the tinfoil-cutting reduction gearbox (41), and the tinfoil-cutting driving motor (42) is electrically connected to the PCB (2); a tinfoil-cutting movable support (43) is mounted at an upper end of the tinfoil-cutting reduction gearbox (41), a power output end of the tinfoil-cutting reduction gearbox (41) is connected to the tinfoil-cutting movable support (43), and a support receiving cavity (431) with an upward opening is formed in the tinfoil-cutting movable support (43); a blade assembly is embedded in the support receiving cavity (431) of the tinfoil-cutting movable support (43), the blade assembly comprises a blade-mounting carrier (44) which is embedded in the support receiving cavity (431), the edge of the blade-mounting carrier (44) is provided with at least two mounting carrier limit notches (441) which both open radially outwardly and are completely through-going from the top down, an internal wall of the support receiving cavity (431) is provided with inwardly raised and wedged support limit projections (432) which correspond to the mounting carrier limit notches (441), respectively, and each support limit projection (432) is provided with an inclined guide slope (4321) and is embedded in a corresponding mounting carrier limit notch (441); the blade-mounting carrier (44) is provided, corresponding to respective mounting carrier limit notches (441), with blade-mounting holes (442) which open radially outwardly and communicate with the corresponding mounting carrier limit notches (441), an L-shaped blade-mounting block (45) is embedded in each blade-mounting hole (442), each blade-mounting block (45) comprises a horizontally extending horizontal mounting block portion (451) and a vertically extending vertical mounting block portion (452) integrated with the horizontal mounting block portion (451), the horizontal mounting block portion (451) of each blade-mounting block (45) is embedded in the corresponding blade-mounting hole (442), an upper end of the vertical mounting block portion (452) of each blade-mounting block (45) extends to an upper end side of the blade-mounting carrier (44), and a tinfoil-cutting blade (46) is mounted at the upper end of the vertical mounting block portion (452) of each blade-mounting block (45); and a horizontal spring (47) is embedded in each blade-mounting hole (442) on the inner side of the horizontal mounting block portion (451) of the corresponding blade-mounting block (45), an inner end of each horizontal spring (7) abuts against the blade-mounting carrier (44), and an outer end of each horizontal spring (7) abuts against the horizontal mounting block portion (451) of the corresponding blade-mounting block (45).

2. The electric vacuum-pumping and tinfoil-cutting integrated machine according to claim 1, characterized in that an annular protective cover (48) is buckled at the upper end of the tinfoil-cutting movable support (43), and the protective cover (48) is provided with a protective flange (481) which protrudes and extends inwardly and is located at the upper end side of the tinfoil-cutting blades (46).

3. The electric vacuum-pumping and tinfoil-cutting integrated machine according to claim 2, characterized in that the tinfoil-cutting reduction gearbox can be embedded in the outer housing receiving cavity (111) of the fixed outer housing (11) in a manner capable of moving up and down relatively, a tinfoil-cutting reset spring (49) is mounted between the tinfoil-cutting reduction gearbox and the fixed inner housing (12), an upper end of the tinfoil-cutting reset spring (49) abuts against the lower end of the tinfoil-cutting reduction gearbox (41), and a lower end thereof abuts against the upper end of the fixed inner housing (12); the upper end of the fixed inner housing (12) is provided with an upwardly raised spring guide pin (122) corresponding to the tinfoil-cutting reset spring (49), and the lower end of the tinfoil-cutting reset spring (49) is sleeved at the periphery of the spring guide pin (122); the upper end of the fixed outer housing (11) is provided with an upper end anti-disengagement limit notch (112) on the internal wall of the outer housing receiving cavity (111), the upper end of the tinfoil-cutting reduction gearbox (41) is provided with an upper end anti-disengagement limit projection (411) which is embedded in the upper end anti-disengagement limit notch (112), and an upper end edge of the upper end anti-disengagement limit projection (411) abuts against an upper end edge of the upper end anti-disengagement limit notch (112).

4. The electric vacuum-pumping and tinfoil-cutting integrated machine according to claim 3, characterized in that a lower end of the tinfoil-cutting driving motor (42) extends in the inner housing receiving cavity (121) of the fixed inner housing (12), the PCB (2) is provided with a tinfoil-cutting trigger switch (21) located on the lower end side of the tinfoil-cutting driving motor (42), and the tinfoil-cutting trigger switch (21) is electrically connected to the PCB (2); when the tinfoil-cutting driving motor (42) comes into contact with the tinfoil-cutting trigger switch (21), the PCB (2) controls the tinfoil-cutting driving motor (42) to start.

5. The electric vacuum-pumping and tinfoil-cutting integrated machine according to claim 4, characterized in that the electric vacuum-pumping assembly (5) comprises a vacuum pump case (51) which comprises a lower vacuum pump case (511) and an upper vacuum pump case (512) mounted at an upper end of the lower vacuum pump case (511), a vacuum pump receiving cavity (513) is formed between the lower vacuum pump case (511) and the upper vacuum pump case (512), a vacuum-pumping driving motor (52) electrically connected to the PCB (2) is mounted at an upper end of the upper vacuum pump case (512), and a power output shaft of the vacuum-pumping driving motor (52) passes downwardly through the upper vacuum pump case (512) and extends into the vacuum pump receiving cavity (513); a lower seal cover (53), an upper seal cover (54) and a leather cup support (55), which are successively connected to each other from the top down and are successively clamped between the lower vacuum pump case (511) and the upper vacuum pump case (512), are embedded in the vacuum pump receiving cavity (513), and a vacuum-pumping piston (56) is clamped between the upper seal cover (54) and the leather cup support (55);

a vacuum-pumping cavity (571) and an air outlet cavity (572) which are arranged as spaced apart are formed between the lower seal cover (53) and the upper seal cover (54), a piston cavity (573) is formed between the vacuum-pumping piston (56) and the upper seal cover (54), a lower cover locating hole with a downward opening is formed in a lower surface of the lower vacuum pump case (511), a lower case air pumping hole (574), which is completely through-going from the top down and communicates with the lower cover locating hole, is formed at an upper end of the lower vacuum pump case (511), the lower seal cover (53) is provided with a lower cover air pumping hole (575) configured to communicate the vacuum-pumping cavity (571) with the lower case air pumping hole (574) and a lower cover air outlet hole communicated with the air outlet cavity (572), the upper seal cover (54) is provided with an air pumping one-way hole (576) configured to communicate the vacuum-pumping cavity (571) with the piston cavity (573) and an air outlet one-way hole configured to communicate the piston cavity (573) with the air outlet cavity (572), and the upper seal cover (54) is provided with an air pumping one-way valve (577) corresponding to the air pumping one-way hole (576), and an air outlet one-way valve (578) corresponding to the air outlet one-way hole; and the vacuum-pumping piston (56) is provided with a swing seat (581) which is in driving connection to the vacuum-pumping piston (56), and an upper end of the swing seat (581) is connected to the power output shaft of the vacuum-pumping driving motor (52) by a rotating shaft (582).

6. The electric vacuum-pumping and tinfoil-cutting integrated machine according to claim 5, characterized in that the vacuum pump case (51) can be embedded in the outer housing receiving cavity (111) of the fixed outer housing (11) in a manner capable of moving up and down relatively, an upper case shoulder (5121) is arranged at a lower end edge of the upper vacuum pump case (512), a vacuum-pumping reset spring (59) is sleeved at the periphery of the upper vacuum pump case (512), and a lower end of the vacuum-pumping reset spring (59) abuts against a lower case shoulder and an upper end thereof abuts against the lower end of the fixed inner housing (12); the lower end of the fixed outer housing (11) is provided with a lower end anti-disengagement limit notch (113) on the internal wall of the outer housing receiving cavity (111), the edge of upper case shoulder (5121) of the upper vacuum pump case (512) is provided with a lower end anti-disengagement limit projection (5122) which is embedded in the lower end anti-disengagement limit notch (113), and a lower end edge of the lower end anti-disengagement limit projection (5122) abuts against a lower end edge of the lower end anti-disengagement limit notch (113).

7. The electric vacuum-pumping and tinfoil-cutting integrated machine according to claim 6, characterized in that an upper end of the vacuum-pumping driving motor (52) extends in the inner housing receiving cavity (121) of the fixed inner housing (12), the PCB (2) is provided with a vacuum-pumping trigger switch (22) located on the upper end side of the vacuum-pumping driving motor (52), and the vacuum-pumping trigger switch (22) is electrically connected to the PCB (2); when the vacuum-pumping driving motor (52) comes into contact with the vacuum-pumping trigger switch (22), the PCB (2) controls the vacuum-pumping driving motor (52) to start.

8. The electric vacuum-pumping and tinfoil-cutting integrated machine according to claim 1, characterized in that the battery (3) is a rechargeable battery.

9. The electric vacuum-pumping and tinfoil-cutting integrated machine according to claim 8, characterized in that the PCB (2) is provided with a charging port (23) which is electrically connected to the PCB (2), the fixed outer housing (11) and the fixed inner housing (12) are respectively provided with a charging jack (13) which is completely through-going from the top down and aligned with the charging port (23).

* * * * *